No. 870,649.           PATENTED NOV. 12, 1907.
T. C. STEIMER.
GLASS GATHERING AND PRESSING MACHINE.
APPLICATION FILED MAR. 10, 1906.

Witness:
Chas S Ripley
O M Clarke

Inventor:
T. C. Steimer
By F. W. H. Clay
His Atty.

No. 870,649. PATENTED NOV. 12, 1907.
T. C. STEIMER.
GLASS GATHERING AND PRESSING MACHINE.
APPLICATION FILED MAR. 10, 1906.
5 SHEETS—SHEET 5.

T. C. Steimer
INVENTOR,
By F. W. H. Clay
His Atty.

WITNESS:

UNITED STATES PATENT OFFICE.

THEODORE C. STEIMER, OF BUCKHANNON, WEST VIRGINIA.

GLASS GATHERING AND PRESSING MACHINE.

No. 870,649.         Specification of Letters Patent.         Patented Nov. 12, 1907.

Application filed March 10, 1906. Serial No. 305,425.

*To all whom it may concern:*

Be it known that I, THEODORE C. STEIMER, a citizen of the United States, residing at Buckhannon, Upshur county, in the State of West Virginia, have invented certain new and useful Improvements in Glass Gathering and Pressing Machines, of which the following is a specification.

My invention relates to the art of working plastic materials such as glass, and particularly to mechanism for gathering measured charges of molten glass and pressing articles in molds, by automatic machinery.

The objects of the invention are, to "gather" or take out of the melting pot or furnace definite predetermined quantities of material so as to avoid waste in charging the mold; to enable the glass to be handled at its highest or any temperature; to provide for making any number of articles of perfectly uniform weight and to accurately adjust the quantity of material used in the same; to automatically deposit the glass in the molds and eject the finished article therefrom; to avoid suction in withdrawing the plunger from the mold and otherwise improve the operation thereof; to operate a number of such gatherers and molds so as to allow cooling of the same, to adapt the feed of the machine to the changing level of the glass in the pot, and generally improve the construction and operation of glass working machines. These objects and other advantages to hereinafter appear, are attained by the construction illustrated in the accompanying drawings.

Fig. 2 is a front elevation, with the gathering device in position to drop its charge in one of the molds and another in position for the pressing operation;
Fig. 3 is a plan view of the whole machine, in the position of the parts as in Fig. 2;
Fig. 3$^a$ is a detail section of the press operating cams and their casing;
Fig. 4 is a vertical section along the line (4—4) in Fig. 3, showing the interior construction of the mechanism for operating the gathering device;
and Fig. 4$^a$ is a detail of the tripping dog;
Figs. 5 and 5$^a$ are detail sections of the valves on the operating cylinders;
Figs. 6 and 6$^a$ are detail views of two sides of the cams for operating the press plungers;
Fig. 7 is a detail showing the ratchet two-part driving pinions for engaging a rack for turning the mold carriage.

At the present time it is customary to "gather" the charge of glass on an iron rod or "punty" by means of the adhesion of the glass to iron, and consequently it is necessary, after melting the glass in the pot or furnace, to wait till it cools to a consistency at which it will adhere in sufficient quantity to the rod. The material must then be handled very quickly in order to deposit it in the mold before it becomes too stiff. The quantity deposited is usually estimated by the workmen at each separate charge, and the residue is cut off from the rod and discarded as scrap to be remelted again.

In my apparatus the glass may be taken practically at its highest liquid state, and the exact amount needed for the mold is measured and cut off before removing it from the pot or furnace and delivered to the mold, thereby avoiding waste as well as saving time and enabling the molded article to be made very light in weight, owing to the high temperature of the melted glass. I will first describe the mechanism for this operation.

Figure 13:
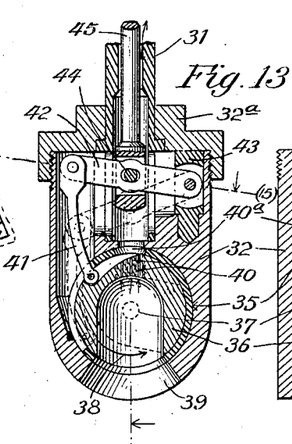
Fig. 13 is a vertical central section of the gathering and measuring device.
Figure 14:
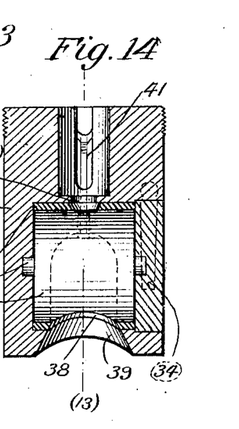
Fig. 14 is a section of the same taken at right angles to the section of Fig. 13.
Figure 15:
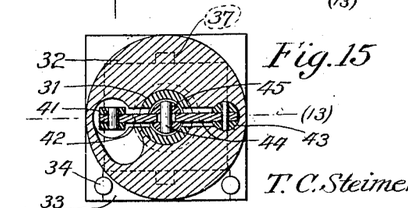
Fig. 15 is a horizontal section on the line (15) in Fig. 13.

In the drawings it will be seen that I have illustrated the machine as mounted on a portable carriage; upon the base plate 17 is placed a motor 18 and suitable uprights 19, 19$^a$ and 19$^b$, and a stationary shell 20, for the support of the mechanism. Within the shell 20 is a revolving hollow cylinder 21 which is shown more clearly in Fig. 4. At its base it is closed and provided with an inwardly turned conical socket 22, making an air-tight joint with the cone 23 on the base plate, through which compressed air is admitted by the pipe 24. On the outside the bottom has an extended flange carrying gear teeth 25 for rotation of the cylinder. On the top of the cylinder 21 is a hollow post extension 26, ending in a hollow square box 27, closed at the top. This box 27 has jointed to it on hollow trunnions 54 a set of cylinders 28, which normally hang in a vertical position and are provided with pistons 29 and with tubular piston rods 30. Within the rod 30 is a tube 31 which carries at its lower end the gathering and measuring device 32. Referring especially to Fig. 13, 14 and 15, which show this important feature of my invention in detail, it will be seen that the hollow tube 31 carries a head 32$^a$ within which is preferably threaded the casing block 32. This block is bored with a horizontal cylindrical opening, which is closed by a plate 33 held in place by pins 34, and it is provided with a renewable steel lining 35. Again within the lining there is carried a measuring block and cutter 36, mounted upon trunnions 37 as shown in Fig. 14. The block 36 is preferably bored with a round opening 38 as shown in Fig. 13, and opposite to this opening there is a flared opening 39 in the casing block 32. It will be observed that by this construction the block 36 has a knife or cutting edge around the opening 38 therein, and that by turning this block the device is closed completely and at the same time the the glass is cleanly severed. At the back of the opening 38 in block 36 are a series of small holes 40 to allow the escape of the air within the measuring cup and also to allow of the admission of compressed air through tube 31 and ports 30ª shown in Fig. 4, to eject the charge of glass, as will be described later. Referring to Fig. 13 again, it will be seen that there is pivoted to the block 36 a link 41 which in turn is pivoted to a lever 42 fulcrumed in the slotted pin 43, and by a pin 44 it is engaged by the actuating rod 45 which extends upwardly through the tube 31.

Figures 1, 8, 9:
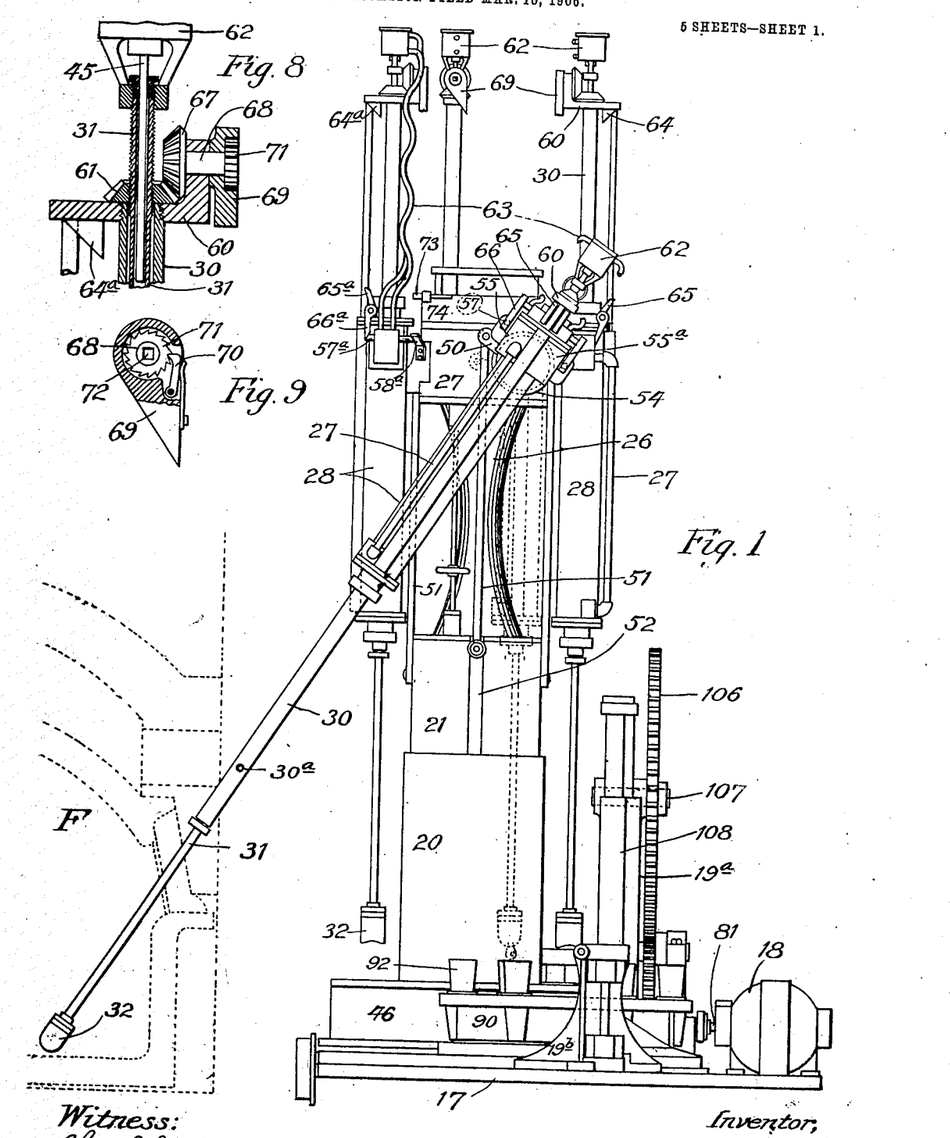
Figure 1 is a side elevation of the complete machine, showing one of the gathering devices extended into the melting pot and taking a charge.
Figs. 8 and 9 are details showing the operation of the feeding devices for the support of the gathering cup.

In Fig. 1 the cylinder 28 is shown as turned into the position to thrust the gathering device into any form of melting pot or tank furnace, F. It will be noted that the cylinder and other devices may be turned at any angle and that if desired a special furnace may be used with a single hole in it at any convenient point; but my machine may be used with any other common furnaces or melting pots now in use. Referring to Fig. 1 and 4 especially, and supposing the revolving supporting cylinder 21 with the head 27 to have been turned to the proper position; at the base there is provided a large traveling gear ring 46 shown in plan in Fig. 3, which is driven by a gear 47 as will be described later, and is so placed that it comes in contact with the geared base flange of the cylinder 21 only at one point, and then leaves it, being of a much larger diameter than said cylinder flange. Inside this ring 46 it has a slot cam 48 with a raised portion indicated at 49 in Fig. 4. Connected to the top of the pivoted cylinder 28 near its trunnion is an arm 50 to which is attached a rod 51, which in turn is pivoted to a sliding rod 52 traveling in a vertical slot in the outside of the cylinder 21. At the bottom of the rod 52 it has a stud carrying a roller 53 which operates in the slot cam 48. It will be seen that when the raised portion 49 of the cam engages the roller 53, the bar 52 and link 51 will be raised, which will throw the operating cylinder 28 over into the angular position shown in Fig. 1. Referring to Fig. 4, the trunnion 54 of the cylinder 28 is hollow, and the cylinder carries on one side a valve box 55 as shown in Fig. 5 and 5ª, within which operates a slide valve 56 to admit compressed air to either the top or bottom of the operating cylinder. For this purpose the valve has on each side a stem 57, and as will be seen in Figs. 1 and 4ª there is mounted on the supporting box 27 a stationary tripping lug 58 in such a position that as the cylinder is swung over to its angular position it will strike the stem 57 of the slide valve, which will open the ports in proper manner to admit air above the piston 29 and thereby shove the gathering device 32 down into the melting pot. Before this operation it will be understood that the gathering device has been in the open position; in Fig. 4 it will be seen that when the piston rod 30 is raised, a port 30ª therein is open to the air pressure in the cylinder, and communicates by slot and port 31ª with the inner tube 31. This results not only in forcibly expelling the charge of glass when the measuring cup is first opened, but thereafter until the rod is thrust out in order that another charge may be taken, the air continues to blow through the small openings 40 shown in Fig. 13, thus keeping the gathering device cool.

The devices for operating the measuring cup in the gatherer are shown in Fig. 1. The inner tube 31 which carries the gatherer extends upward and entirely through the length of the hollow piston rod 30 and at its top it is fixed to a small plate 60, while the tube 31 fits neatly in the tube 30 and is threaded near the upper end through a sufficient length and engages a threaded gear-wheel 61, which is for a purpose presently to be described. The tube 31 at the top carries a small cylinder 62 which is provided with a piston attached to the rod 45 for operating the measuring cup in the gatherer. Any suitable connection, such as the coil pipes 63 may be used to convey the air from the valve box 55ª to upper and lower ports in the cylinder 62. It will be seen that when air is admitted above the piston in the cylinder 62 the rod 45 will be shoved downward to close the measuring cup 36, and when this is exhausted and pressure is admitted below the piston it will open the measuring cup. The air ports for this purpose are shifted automatically when the gatherer is thrust down, by means of the lug 64ª on the head-plate 60 of the piston tube 30. As it descends it strikes a lever 65ª which is pivoted on the same shaft with the arm 66ª, and which stands over the pin 57ª on the slide valve, and by means of proper ports admits the air to the under side of the piston in cylinder 62 to close the measuring cup. The opening of the cup to discharge the glass into the mold after the operating cylinder 28 has swung back to a vertical position, is accomplished by the pin 57ª of the slide valve 56ª striking the tripping lug 58ª; this admits pressure through a pipe to the underside of the piston in the cylinder 62 and opens the cup. Just at this point, as before explained, the ports 30ª and 31ª shown in Fig. 4 being drawn inside the cylinder, are open and compressed air enters and quickly and forcibly discharges the glass into the mold.

In order that the successive positions of the gatherer may follow the surface of the glass as it falls in being taken out of the pot, there is an automatic mechanism for gradually extending the feed of the supporting devices. The positions of the parts in Fig. 1 show the tube 31 entirely extended, since the glass has been taken out of the pot from full condition down to practically the end of the supply. Referring especially to Figs. 8 and 9, the position of the inner tube 31 with respect to the outer tube 30 is determined by the position of the gear 61 on the tube 31. That is, as the gear 61 on the top of tube 30 is threaded up and down the tube 31 the extension of the latter from the cylinder piston tube is greater or less.

Meshed with the gear 61 is a beveled gear 67 supported with its shaft 68 in an upward extension of the plate 60, and on the outer end of the shaft 68 is mounted a trip lever 69 which carries a spring pressed dog 70 engaging the teeth of a circular ratchet 71 fixed on the shaft 68. From Fig. 9 it will be seen that the trip 69 hangs downward and has an inclined face. In order to move the gears at each descent of the gatherer into the pot, so as to gradually feed out the tube 31, I have provided a pin 73 mounted on an adjustable ring 74 carried on top box 27 of the central supporting column. Each time the trip 69 descends it strikes the pin 73 and thus turning the ratchet head 71 and shaft 68, causes the gear wheel 61 to turn on the tube 31 and extends it further into the tube 30.

The feeding device operates to extend the tube 21 out of the tube 30 by any distance desired, depending on the length of the threaded portion of the tube 31. A reverse feed of the extension, so that at each descent of the measuring device it will be shortened in its reach, could of course be accomplished by merely reversing the dog 69 in its position on its shaft 68. But usually it is more convenient to return the tube 31 more rapidly; and for this purpose it will be noted that the shaft 68 is provided with an angular opening 72, in which a crank wrench may be inserted and the shaft 68 turned manually independent of the trip 69, the spring dog 70 allowing such motion. In case the machine is used with continuous tanks, in which the level of the molten glass remains the same, the feeding devices illustrated in Figs. 8 and 9, as well as the adjusting ring 74, could be entirely omitted; but the same result would be obtained by simply lowering the ring 74 until the pins 73 were out of register and do not operate upon the trip 69. In order to regulate the amount of this motion given to the tube at each descent, the height of the pin 73 may be adjusted as shown clearly at the top of Fig. 4; the top of the box 27 has an upwardly extended ring 74 threaded into a movable ring 75, which latter rides on upright studs 75ᵃ fixed on top of the box 27. The inside of the ring 74 is provided with gear teeth and engages a pinion 76 which is carried on a shaft 77 extending downward through a cast core in the box 27 (so as not to interfere with the air tight condition of the box), and it has a hand wheel 78 by which the rod and pinion 76 may be turned in order to revolve the ring 74 and raise or lower the ring 76 for the purpose just described.

Figure 10:
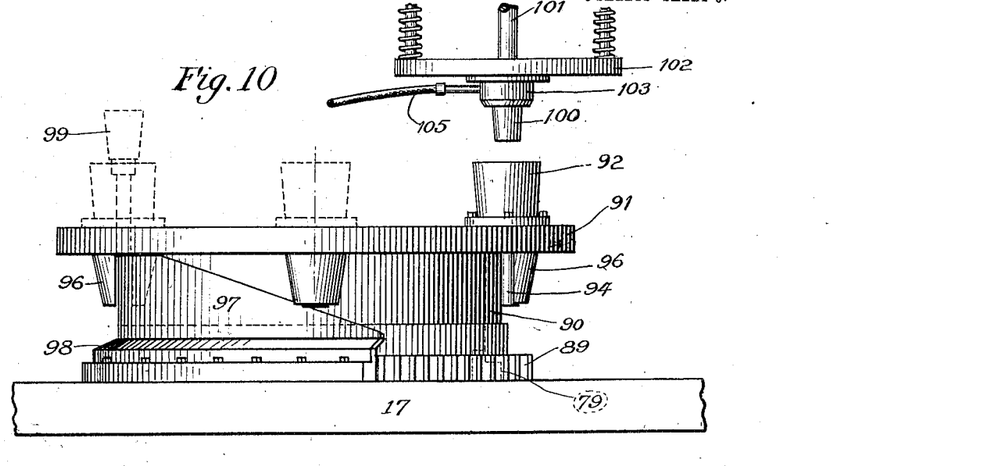
Fig. 10 is a side elevation of the mold carriage plate and the cam for use in ejecting the article from the mold.
Figure 11:
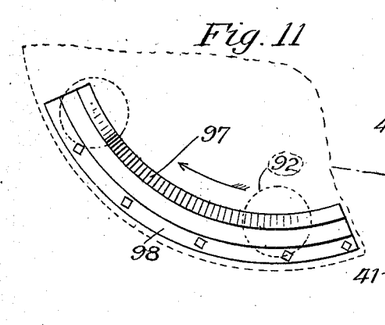
Fig. 11 is a plan view of the cam.
Figure 12:
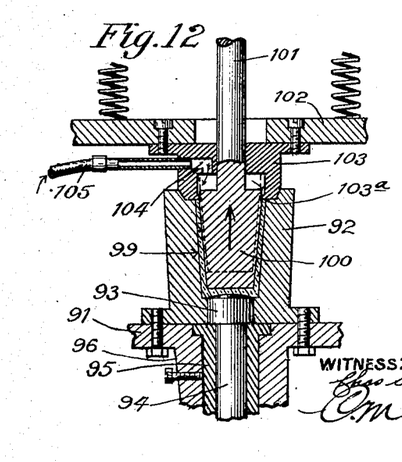
Fig. 12 is a vertical central section of the mold, showing the plunger in place therein.

The apparatus just described may be used with any form of mold or mold-carrying machines, but is specially adapted for the set of traveling molds shown, designed to automatically coöperate with the glass-gathering devices, which deposit in them an accurately measured and uniform quantity. The shaft 81 of the motor 18 carries a pinion engaging a reducing gear on shaft 81ᵃ which in turn carries a pinion which engages with the large gear wheel 83, shown in Fig. 2. This wheel has a crank 84, which reciprocates the horizontal rack 85. For moving the mold carrying table this rack engages a pinion 86, which is made in the form shown in section at Fig. 7, being composed of a solid portion 86ᵃ fixed on its shaft 87, and a loose portion carrying the teeth and loosely resting on the solid portion 86ᵃ. This latter has a circular rack on its flat face which is engaged by spring pin 86ᵇ, so that the outer past 86 may revolve freely in one direction, but will drive the shaft 87 in the other. At the lower end of this shaft there is a pinion 88, which engages the geared flange 89 of a ring 90, as shown in Fig. 10, which on its top has the plate 91 carrying any number of molds 92, as may be desired. The support and guiding of the ring 90 is the same as shown in Fig. 4 for supporting the gear ring 46, being a guide ring 79. The gear 89 also engages the base of column 21, in order to insure corresponding movements; and this column is driven intermittently by pinion 86ᵃ entirely similar to that just described. It will be noticed that by this motion of the rack and pinion, while the gear 83 revolves at a constant rate, the mold-supporting ring 91 will be given an intermittent movement which is slow at starting and slow at stopping, but is rapid at the central part of the motion, and that as the rack 85 is drawn backward, the mold is left stationary, the column 21 also having the same motion. The molds 92 are shown in detail in Fig. 12. The bottom is closed by the valve-head 93, which has a downwardly extending shank 94, guided in a split tube 95 and secured in the split socket 96. This valve 93 is used to lift the article 99 out of the mold when finished, and I prefer to accomplish this by means of a cam 97, supported upon the base 98 on the frame 17 of the machine, as shown in Fig. 10. It will be understood that after the mold containing the article 99 has traveled one step allowing sufficient cooling, at the next movement the shank 94 is engaged by the cam 97, which enters the slots of the socket 96 and sleeve 95, and is thus pushed up into the position as shown in dotted lines at the left of Fig. 10, automatically ejecting the article. In place of the usual mold ring, I attach to the spring presser plate 102 a hollow mold ring 103, which has a space somewhat larger than the top of the plunger 100 and comes in contact with it only when the plunger is down in its extreme position, as indicated at the point marked 103ᵃ. The opening in the ring is connected by a port 104 to an air pipe 105, and compressed air is introduced behind the plunger. As the plunger rises, after pressing the glass in the mold, it first opens the port 103ᵃ, and allows compressed air to enter between the plunger and the article. This is for the purpose of preventing the distortion of the article by suction, a difficulty found in all present molds. The compressed air holds the yet pliable glass out against the mold 92, leaving the article to set in perfect form. As the plunger rises still further, it will be noted that it covers the port 104, thus shutting off the inlet of air.

Figures 2, 6, 6A, 7:
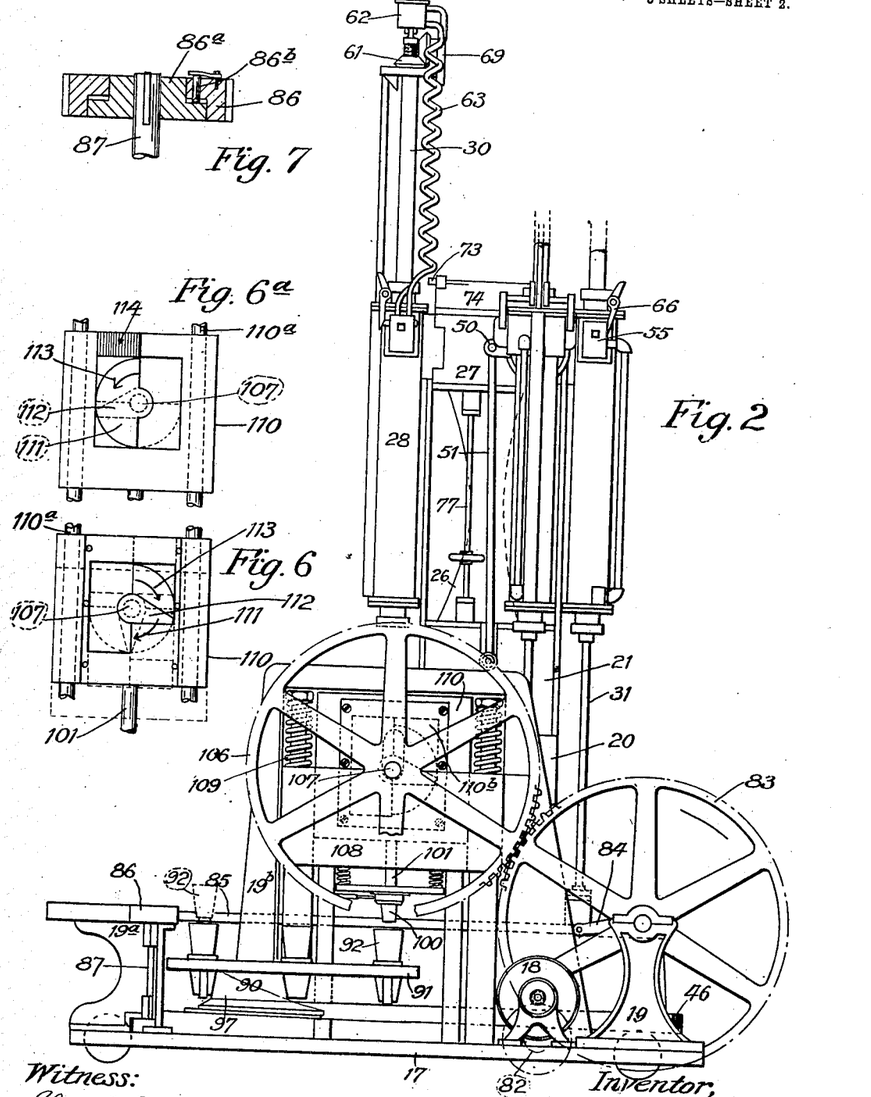
Figures 3, 3A:
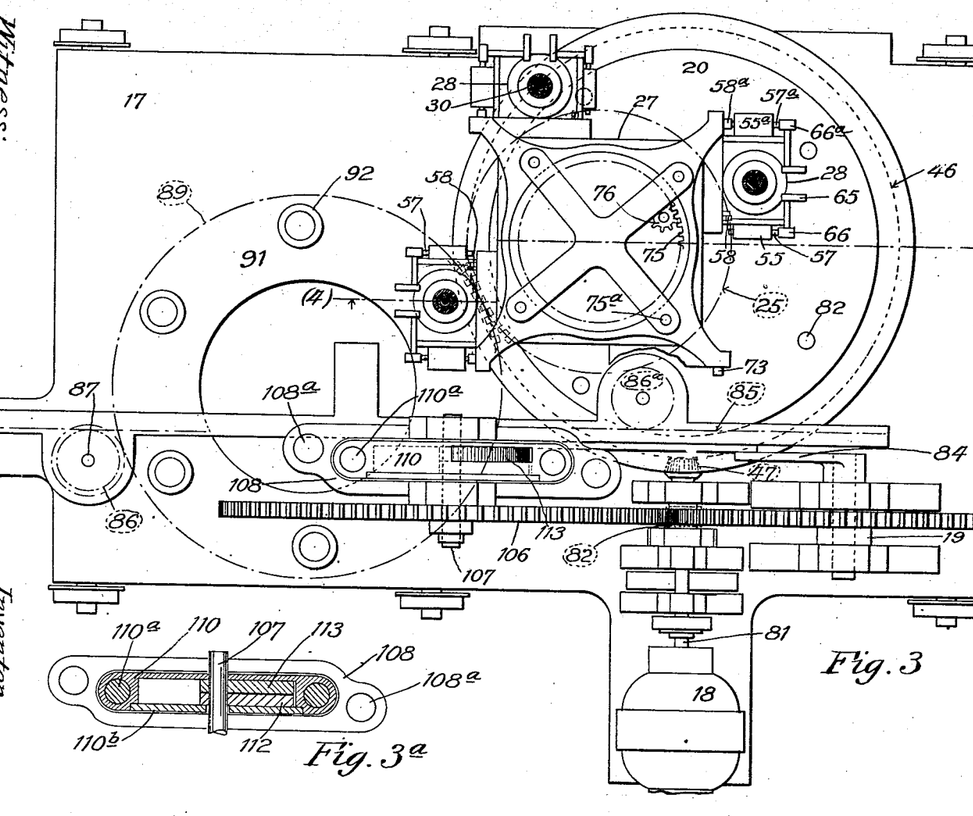
Figures 4, 4A, 5, 5A:
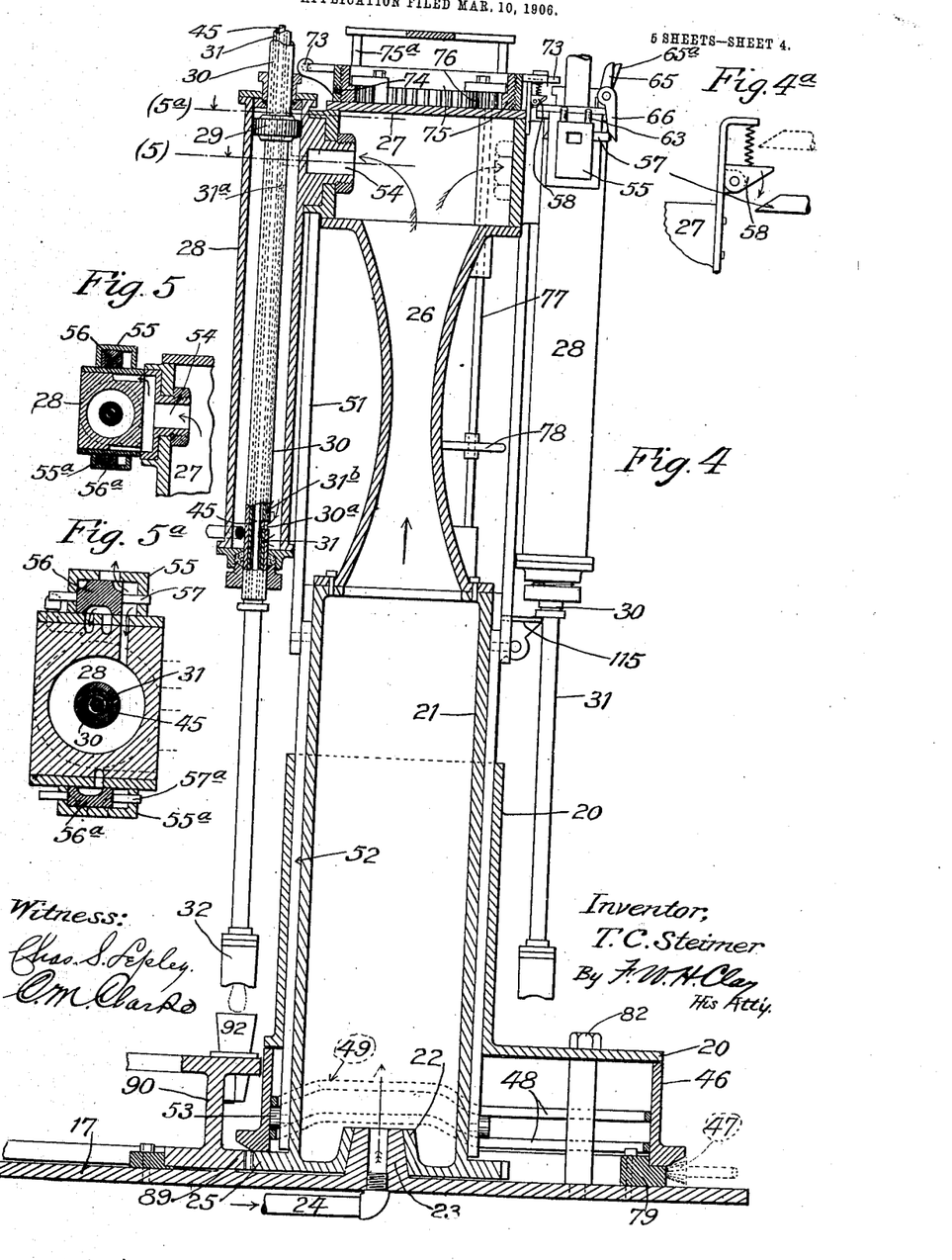

For operation of the plungers, it will be seen on referring to Figs. 2, 3 and 6, that the large gear wheel 83 meshes with the gear wheel 106, carried on the shaft 107, which is supported upon a frame 108 in the upright 19ᵃ, ang duided on vertical posts 108ᵃ, and held down by springs 109, in order that it may give in case the pressure of the plunger is too great and overtaxes the machinery, and thus also prevent crushing the glass article. As shown in Fig. 3, a movable cam box 110 carrying the plunger rod 101 slides vertically within the housing 108, and on guide posts 110ᵃ. This box has an open space in which projects through half its thickness a cam shoulder 111 to coöperate with an arm 112 fixed upon the shaft 107, so that as the shaft revolves the arm engages shoulder 111 and pushes the box 112 downward to thrust the plunger 100 into the mold. Also fixed on the shaft 107 is a semi-circumferential cam 113 with its flat side at right angles to the arm 112, so that as the box 110 is depressed into the position shown by dotted lines, the flat side of cam 113 allows this motion, by passing into the open slot 114 on the rear side (see Fig. 6ᵃ), until the upper side of the opening in the box rests upon the flat face of the large cam 113, which latter then immediately raises it to original position, and holds it in raised position during half a revolution of the cam and shaft 107. By this mechanism I get the desired motion of the plunger from a constantly revolving shaft. A cover plate 110ᵇ, not shown in Fig. 6, may be used to protect the cams; and it is slotted as shown in Fig. 2 to allow of movement over shaft 107.

By the motion of the parts of the machine, the molds and gatherers are out of action and cooling for a sufficient time, and for additionally cooling the gatherers, the compressed air is allowed to escape through them, as before described, or any other cooling process may be applied. From Fig. 4 it will be seen that in order to prevent the possible falling of the gatherer during this inactive period, there is provided under each cylinder a bracket 115 which is mounted on the revolving column 21 and in position to engage the lower end of the piston tube 30 when the cylinder 28 is in vertical position. The motion of the column supporting the cylinders carrying the gatherers is the same as the motion of the mold plate as they approach each other, for depositing the glass from the gatherers into the molds, and the starting and stopping motion of both are gradual. As a further precaution against their getting out of register, the geared flange 89 of the mold supporting plate also engages the gear of ring 46 on the base of column 21, as shown in Figs. 3 and 4.

From the above description, it will be evident that the operation is as follows. Any one of the cylinders 28 being in vertical position in front of the machine, and the gathering and measuring device 32 being open, the piston 29 being at the top of its cylinder 28, and the air pressure underneath the same also blowing through the perforations 40 of the measuring cup 36, it will be clear that as the raised portion 49 of the cam 48 arrives at the point of tangency to the outside of the upright column 21, the cam will engage the roller 53, and by means of bar 52, will give an upward thrust upon the arm 50, and swing the cylinder over into angular position, as shown in Fig. 1. At this point the pin 57ª of the slide valve 56ª will strike the tripping dog 58ª on the box 27, and being unyielding in this direction will push the valve over into position, to allow exhaust of the air under the piston 29 and introduce it above the same. This will thrust the piston tube 30 downward, and the extension tube 31 having been extended to proper length by the feeding device illustrated in Fig. 8, the gatherer 32 will be thrust into the molten glass in a straight-away direction and to a proper depth. The flared opening 39 of the casing will collect and force into the cup 36 a full measure of glass, the air therein being meantime expelled through the openings 40 and the passages between the tube 31 and the rod 45, escaping through the openings 30ª and 31ª, which are now outside of the cylinder. When the head 60 is by this motion of the piston drawn down to its lowest position, the tripping dog 64ª will strike the stem of the valve 56ª (Fig. 5), and put it in position to introduce air through the pipe 63 to the upper side of cylinder 62, thus thrusting the rod 45 downward, and by means of the links 41, 42, closing the measuring cup 36 and shearing off the glass cleanly, taking an exact predetermined quantity of glass, which will be regulated by the size of the opening in this interchangeable measuring cup 36. At the same time, or immediately after, a similar dog 64 also strikes the arm 65 of the lever 66, and thrusts over the pin 57 of the main valve 56, which opens the upper end of cylinder 28 to the exhaust, and introduces air to the lower end by means of the pipe 27. The gatherer 32 is thus drawn out of the furnace, and at this time the downward slope of cam 48 operates upon the roller 53 to bring the cylinder 28 back to vertical position. As it arrives at vertical position the pin 57 may pass the dog 58 (see Fig. 4), but the pin 57ª of the auxiliary valve 56ª strikes the tripping stud 58 and reverses the ports of the valve leading to the cylinder 62, so that the measuring cup 36 is opened, and at the same time the ports 30ª, 31ª, having been drawn into cylinder 28 and exposed to the air pressure therein, a blast of air will take effect through the small openings 40, and forcibly expel the charge of glass into the mold 92, which is now in position under the gatherer.

By means of the rack 85, the mold-carrying table 91, as well as the upright column 21 with its cylinders thereon, will be turned through a part of the circumference sufficient to bring another mold and cylinder in register for repetition of this operation just described. When by this motion the mold 92 arrives under the position of the plunger 100, the arm 112 on the shaft 107 acts upon the cam shoulder 111, and thrusts downward the box 110 and the rod 101, carrying the plunger into the mold. This motion of the plunger is immediately preceded by the plate 102 and mold ring 103 coming into place, under pressure of the springs shown thereon, which are attached to the bottom of the cam boxing 110. The motion of the plunger through the ring also opens the port 104; as the plunger immediately rises again, the port 103ª is opened and compressed air from the pipe 105 enters between the plunger and the still pliable glass article, to keep it correctly in place against the sides of the mold, until the plunger has covered the port 104, when the plunger and ring both rise and the cam 113 having engaged its curved portion with the top of box 110, holds the plunger suspended. At this point the rack 85 again acts upon the pinion 86 and turns the mold plate 91, through a sixth of a circumference in the machine illustrated, and the mold with the article remains standing until the next step of the movement of ring 91; in this next movement, the stem 94 of the valve head 93 is engaged by the cam 97, as shown in Fig. 10, and the article is ejected from the mold, ready to be taken off by the attendant. After the machine has started, it will be noticed that the entire action is automatic, and no attention is required, except to remove the article 99 from the bottom 93, after it is lifted out of the mold. It will be of course understood that I may employ any of the well known mechanical devices to remove the article, so that the machine needs no attendant at all.

The gathering and measuring device may be readily adjusted to suit the amount of glass required, by simply providing a set of the cups 36, any one of which is placed in the block 32 by simply removing the plate 33 and the connecting pin of the link 41. Supposing the operation of the machine to begin with the melting pot or furnace full, it will be observed that as the level falls, the machine itself automatically regulates the reach of the arms carrying the gatherer and follows this level. According to the size of the pot, the level will be lowered with different speeds, and in order to regulate the rate of the feed or alter the distance by which the extension of the tube 31 is moved at each motion, it is only necessary by the hand wheel 78, to adjust the height of the tripping pin 73; as it will be observed that the number of teeth by which the trip 69 turns the gear 61, will depend upon the length of surface on the inclined side of the trip which is traversed by the pin 73. Other advantages of the mechanism will readily occur to those familiar with this art.

Having thus described my invention and illustrated its use, what I claim as new and desire to secure by Letters Patent is the following:

1. The combination with continuously operating automatic glass pressing mechanism, of an automatic gathering device having means to continuously supply the press mold, and cutting off in the furnace before removal from the mass, a definite quantity of glass for said molds.

2. The combination of a continuously operating glass pressing machine, an automatic gathering and measuring mechanism adapted to deliver to each mold a definitely measured quantity of glass, and means by which the gathering head follows the falling level of glass in the furnace in proportion to the amount taken out.

3. In a glass gathering machine, the combination of a measuring device having a cup of definite capacity, means to positively close the cup and sever the charge while the cup is in the mass of glass, and automatic means to thrust the gathering cup into the melting pot and remove it therefrom.

4. The combination with a gathering and measuring device having automatic means to open and close it in the mass of glass, of automatic means to introduce the gatherer into the furnace and to carry the charge of glass and expel it into the mold.

5. In a glass gathering machine, the combination of a set of pivoted cylinders, each having on its piston rod a gathering and measuring device, and suitable mechanism to swing the cylinder and thrust the measuring device into the pot and withdraw it, and means to place the measurer over the mold and to automatically and forcibly expel the charge of glass therefrom.

6. The combination with a pivoted cylinder and means to move it, of an extensible piston rod therefor, a gathering and measuring device on the piston rod, and automatic means to open and close the measuring device, and to carry the piston rod to position to discharge the glass into a mold.

7. In a glass gathering machine a gathering head having means to cut off in the mass and take out of the pot an exact measured quantity of glass, a support and carrier for said head and means to extend the reach of the support in exact proportion to the change of level in a receptacle containing the supply of glass.

8. In a glass gathering machine, a gathering head adapted to remove from a furnace a definite quantity of metal, a supporting arm for the head having a straight-away motion to dip the head in the glass, and an automatic regulating device on the arm adapted to increase the reach of the gatherer in proportion to the measured amount of glass removed.

9. In a glass gathering machine a gathering head with a flared mouth and means to thrust it into the mass of glass and thereby fill it, means to retain the charge, and automatic means to forcibly expel the glass from the gathering head.

10. A glass gathering device comprising a receptacle adapted to dip into the glass, and a rotary cutter inside the receptacle adapted to separate the charge from the mass before removal.

11. In a glass gathering and pressing machine, the combination with a traveling mold plate, and a traveling support carrying a series of gatherers, of a rack and pinion mechanism to move the said mold carrier and gatherer support by harmonic motion, substantially as described.

12. In a glass handling machine a gathering head and means to thrust it into a mass of glass, and means in said head to allow escape of the air and to cut off a definite measured quantity of glass before removal from the mass.

13. In a glass gathering machine, the combination with a reciprocating support carrying a gathering device, and automatic means on said support to extend its reach at each reciprocation.

14. In a gathering machine, the combination with a cylinder and a reciprocating piston rod therein carrying a gathering device, of means for regulating the reach of the piston rod, comprising a threaded extension of the piston rod having a gear wheel threaded thereon, a trip on said extension and a pin on the cylinder adapted for turning said gear at each reciprocation of said rod, substantially as described.

15. In a gathering machine, the combination with a cylinder having a hollow reciprocating piston rod carrying a gathering device, of means for regulating the reach of the rod, comprising a threaded extension therein carrying a gear wheel thereon, a support on the extension carrying an adjustable trip for turning said gear and an adjustable stop engaging the trip at each reciprocation of said rod, substantially as described.

16. A glass gathering and measuring device comprising a casing block with a flared opening, a hollow measuring cup seated in the casing for rotation therein, having an opening in register with said casing opening, and means to turn said measuring cup in the casing to shear off the glass therein.

17. In a glass gathering and measuring device, the combination with an open mouthed casing having a cylindrical opening, of a cylindrical cup turning therein, said cup having a mouth in register with the mouth of the casing, and means to turn the cup, whereby the edge of its opening will sever the glass extending therein.

18. A glass gathering and measuring device comprising a rotary cup having perforations through its bottom, a casing for the cup having an opening registering with the mouth of the cup, and openings for the escape of air, and means to rotate the cup after it is filled so as to sever and separate the glass extending into the cup.

19. A glass measuring cup adapted to receive and cut off a definite quantity of glass in the furnace before removal from the mass, and automatic means to operate the cup and to introduce and remove it from the furnace.

20. A glass measuring device comprising a casing having a flared mouth, a rotary cup and cutter in the casing, means to carry the cup and automatic means on the carrier to rotate the cup, substantially as described.

21. The combination with a rotary measuring cup of means to close and open the same and means to forcibly discharge the glass therefrom, substantially as described.

22. The combination with a measuring cup, of means to cause removal of the air therefrom by pressure of the glass itself when it is thrust into molten glass, and means to eject the glass and cool the cup by a blast of compressed air.

23. In a glass measuring device, the combination with a casing having a mouth and an opening closed by a removable plate, of a combined measuring cup and cutter operating in said opening to intermittently register with the mouth of the casing and removable by taking off said plate.

24. In a glass measuring device, the combination with a casing having a cylindrical opening, of a removable steel lining therein, and a rotary cylindrical measure and cutter within the steel lining, and means for revolving said cutter.

25. The combination with automatic means for gathering and severing a charge of glass from the mass while in a furnace before lifting from the mass, of automatic means to carry it to a mold, and to discharge the glass into the mold.

26. In a feeding device for glass gathering machines, the combination of an extensible supporting arm for a gathering and measuring tool having a threaded portion, a gear threaded thereon, an operating gear and shaft therefor, a trip attached to said shaft and a spring ratchet, and adjustable means to throw the trip through varying arcs, whereby the rate of extension of the arm may be regulated.

27. The combination with a main cylinder 28, having an extensible and adjustable piston rod, of a glass measuring device on one end of said piston rod, operating means for opening and closing the measuring device, comprising an auxiliary cylinder carried on the other end of said piston rod, and automatic means on the main cylinder to operate the closing device when the piston descends carrying the auxiliary cylinder, substantially as described.

28. In a glass gathering machine, the combination of a rotary column 21, a series of pivoted cylinders 28 carried thereon, means to swing said cylinders on their pivots, valves to operate the piston in said cylinders, an automatic glass measuring device carried on the rod of said piston, and means operated by the motion of the pivoted cylinder to open and close the measuring device, substantially as described.

29. In a glass gathering machine the combination of a pivoted main cylinder, an operating piston rod therein carrying an automatic gathering device, said piston rod extending through the top of the main cylinder, and carrying thereon an auxiliary cylinder, and proper trips and valves operated thereby by the swinging movement of the main cylinder to actuate the piston of the auxiliary cylinder and operate the gathering device, substantially as described.

30. In a glass gathering machine, the combination with a cylinder having a piston rod carrying a measuring device, of means for automatically extending the reach of the piston rod, including a ratchet trip, and actuating means whereby the reach of the piston rod may be extended automatically but retracted manually, independent of the mechanism for extending it.

31. In a glass gathering machine the combination of a measuring device, means to support and automatically extend it into and withdraw it from a melting furnace, means to operate the measuring device to fill it and sever the glass in the furnace before removal from the mass, automatic means to feed out the support as the level of the glass changes, and means to regulate the rate of said feed of the support.

32. The combination with an automatic glass pressing mechanism, of a glass gathering device adapted to measure off and sever a definite quantity of glass in the melting furnace before removal from the mass, and mechanism to operate said gatherer and to carry it to the press molds and deposit the charge of glass therein, whereby there is no waste of glass and it can be worked in a highly liquid state, substantially as described.

33. A glass gathering machine having a gathering head and means to thrust it straight forward into the mass of glass, said head having an air escape and being of form adapted to force out the air by pressure of the glass in entering the head, substantially as described.

In testimony whereof I have hereunto signed my name in the presence of the two subscribed witnesses.

T. C. STEIMER.

In presence of—
F. E. GAITHER,
F. W. H. CLAY.